(12) United States Patent
Hurd

(10) Patent No.: US 7,258,260 B2
(45) Date of Patent: Aug. 21, 2007

(54) CARGO SYSTEM ATTACHABLE TO A ROOF RACK

(76) Inventor: Jonathan H. Hurd, 1114 Woodlawn, Ann Arbor, MI (US) 48104

( * ) Notice: Subject to any disclaimer, the term of this patent is extended or adjusted under 35 U.S.C. 154(b) by 353 days.

(21) Appl. No.: 10/652,141

(22) Filed: Aug. 29, 2003

(65) Prior Publication Data
US 2005/0045678 A1    Mar. 3, 2005

(51) Int. Cl.
*B60R 9/00* (2006.01)
(52) U.S. Cl. .................. 224/319; 224/321; 224/324; 224/325; 224/328
(58) Field of Classification Search ............. 224/315, 224/316, 319, 324, 325, 328, 321
See application file for complete search history.

(56) References Cited

U.S. PATENT DOCUMENTS

| | | |
|---|---|---|
| 2,561,199 A * | 7/1951 | Harder ............. 414/462 |
| 3,058,607 A | 10/1962 | Kiley |
| 3,554,416 A | 1/1971 | Bott |
| 3,672,612 A | 6/1972 | Laing, Jr. |
| 3,722,766 A | 3/1973 | Barrineau et al. |
| 3,877,624 A | 4/1975 | Carson |
| 3,888,398 A | 6/1975 | Payne |
| 3,899,110 A | 8/1975 | Binding |
| 3,904,094 A | 9/1975 | Correll |
| 3,907,184 A * | 9/1975 | Zane et al. ........ 224/315 |
| 4,101,061 A | 7/1978 | Sage et al. |
| 4,170,331 A | 10/1979 | Faulstich |
| 4,217,999 A | 8/1980 | Forsman |
| 4,260,084 A * | 4/1981 | Warren, Jr. ........ 224/430 |
| 4,274,568 A | 6/1981 | Bott |
| 4,294,388 A | 10/1981 | Wunstel |
| 4,390,117 A | 6/1983 | Fagan |
| 4,406,387 A | 9/1983 | Rasor |
| 4,618,083 A | 10/1986 | Weger, Jr. |
| 4,682,719 A | 7/1987 | Ernst et al. |
| 4,757,929 A | 7/1988 | Nelson |
| 4,809,943 A | 3/1989 | Taschero |
| 4,813,585 A | 3/1989 | Nutt |
| 4,823,999 A | 4/1989 | Payne |
| 4,997,118 A | 3/1991 | Uebach et al. |
| 5,082,404 A | 1/1992 | Stewart et al. |
| 5,137,194 A | 8/1992 | Kodis |
| 5,181,639 A | 1/1993 | Kvanna |
| 5,242,094 A | 9/1993 | Finley |
| 5,255,832 A | 10/1993 | Christensen |
| 5,397,042 A | 3/1995 | Pedrini |
| 5,419,479 A | 5/1995 | Evels et al. |
| 5,535,929 A | 7/1996 | Neill |
| 5,582,044 A | 12/1996 | Bolich |
| 5,582,313 A * | 12/1996 | Envall ............. 220/4.28 |
| 5,657,914 A | 8/1997 | Stapleton |
| 5,713,498 A | 2/1998 | Cucci |
| 5,758,810 A | 6/1998 | Stapleton |
| 5,779,116 A | 7/1998 | Rosch et al. |
| 5,806,735 A | 9/1998 | Christiansson et al. |
| 5,850,891 A | 12/1998 | Olms et al. |

(Continued)

*Primary Examiner*—Tri M. Mai
(74) *Attorney, Agent, or Firm*—Jeffrey Schox

(57) ABSTRACT

The cargo system of the preferred embodiment includes a container, a first mount coupled to the container, and a second mount coupled to the container for movement between an engaged position and a disengaged position. The cargo system is preferably attachable and securable to a roof rack of a vehicle having a first bar and a second bar.

7 Claims, 6 Drawing Sheets

U.S. PATENT DOCUMENTS

| | | |
|---|---|---|
| 5,996,736 A | 12/1999 | Stankiewicz |
| 6,112,964 A | 9/2000 | Cucheran |
| 6,234,371 B1 * | 5/2001 | Sinn ........................... 224/328 |
| 6,257,470 B1 | 7/2001 | Schaefer |
| 6,273,311 B1 | 8/2001 | Pedrini |
| 6,296,161 B1 | 10/2001 | Van der Feen et al. |
| 6,315,181 B1 | 11/2001 | Bradley et al. |
| 6,464,277 B2 * | 10/2002 | Wilding ..................... 296/37.6 |
| 6,918,521 B2 * | 7/2005 | Settelmayer et al. ........ 224/319 |

* cited by examiner

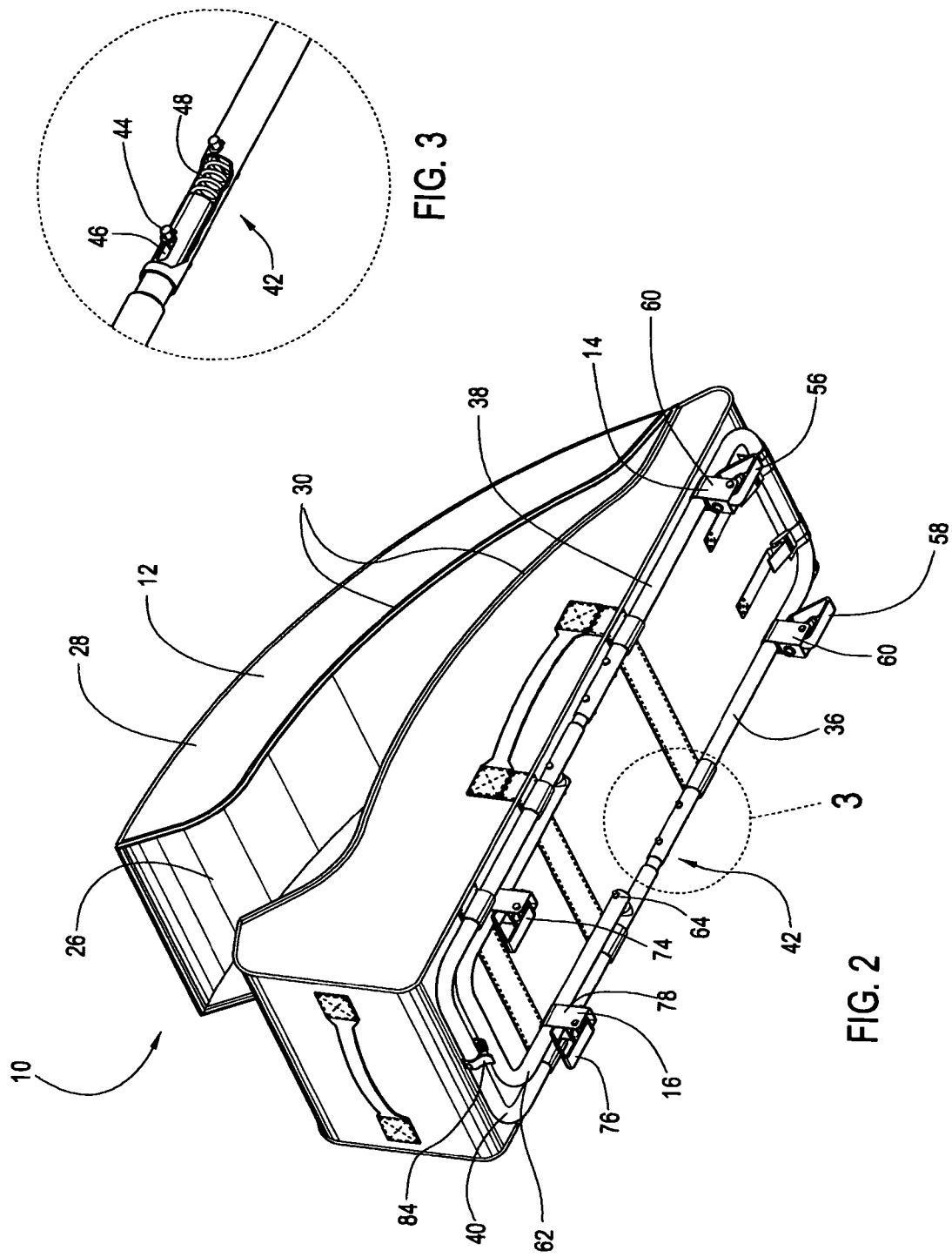

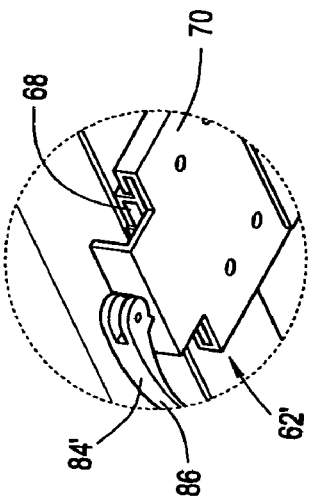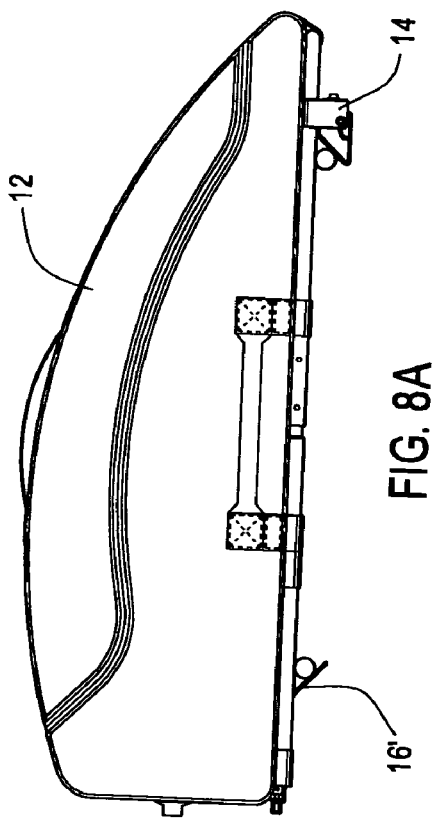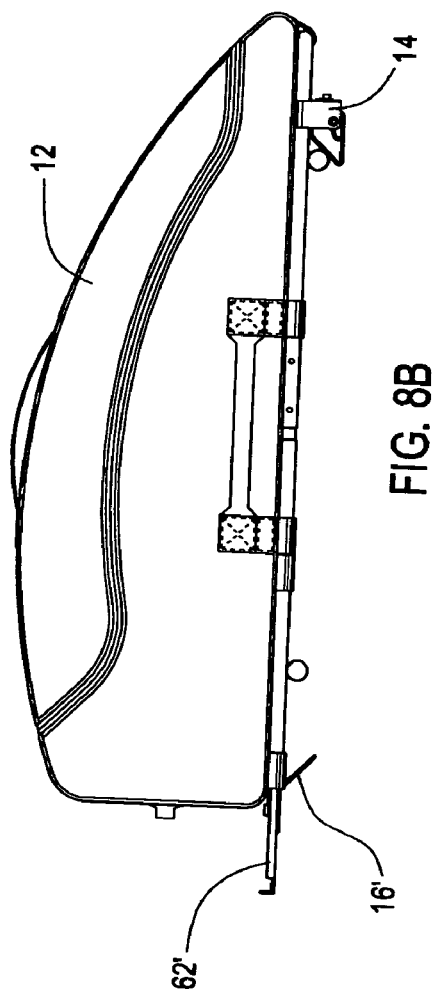

US 7,258,260 B2

CARGO SYSTEM ATTACHABLE TO A ROOF RACK

TECHNICAL FIELD

This invention relates generally to the cargo system field, and more specifically to an improved cargo system that is attachable to a roof rack of a vehicle.

BACKGROUND

Cargo systems that secure additional cargo to a roof rack of a vehicle are generally known. These cargo systems are typically designed with an individual adjustment point located at each corner of the cargo system. With four adjustments points (typically including nuts and bolts), these cargo systems require significant time to secure on, and remove from, the roof rack. This limitation typically dissuades a user from removing the cargo system when the cargo system is not necessary for additional cargo, which results in reduced fuel efficiency for the vehicle.

Thus, there is a need in the cargo system field to create an improved cargo system that is attachable to a roof rack. This invention provides such improvement.

BRIEF DESCRIPTION OF THE FIGURES

FIG. 2 is a perspective view of the cargo system of a first variation of the first preferred embodiment.

FIG. 3 is a detailed view of the connector, also shown in FIG. 2.

FIGS. 8A and 8B are side views of the cargo system of the second preferred embodiment, respectively shown in a closed position and an open position.

FIG. 9 is a detailed view of the latch and arm, also shown in FIG. 7.

DESCRIPTION OF THE PREFERRED EMBODIMENTS

The following description of two preferred embodiments of the invention is not intended to limit the invention to these preferred embodiments, but rather to enable a person skilled in the art of cargo systems to make and use this invention.

Figure 1:
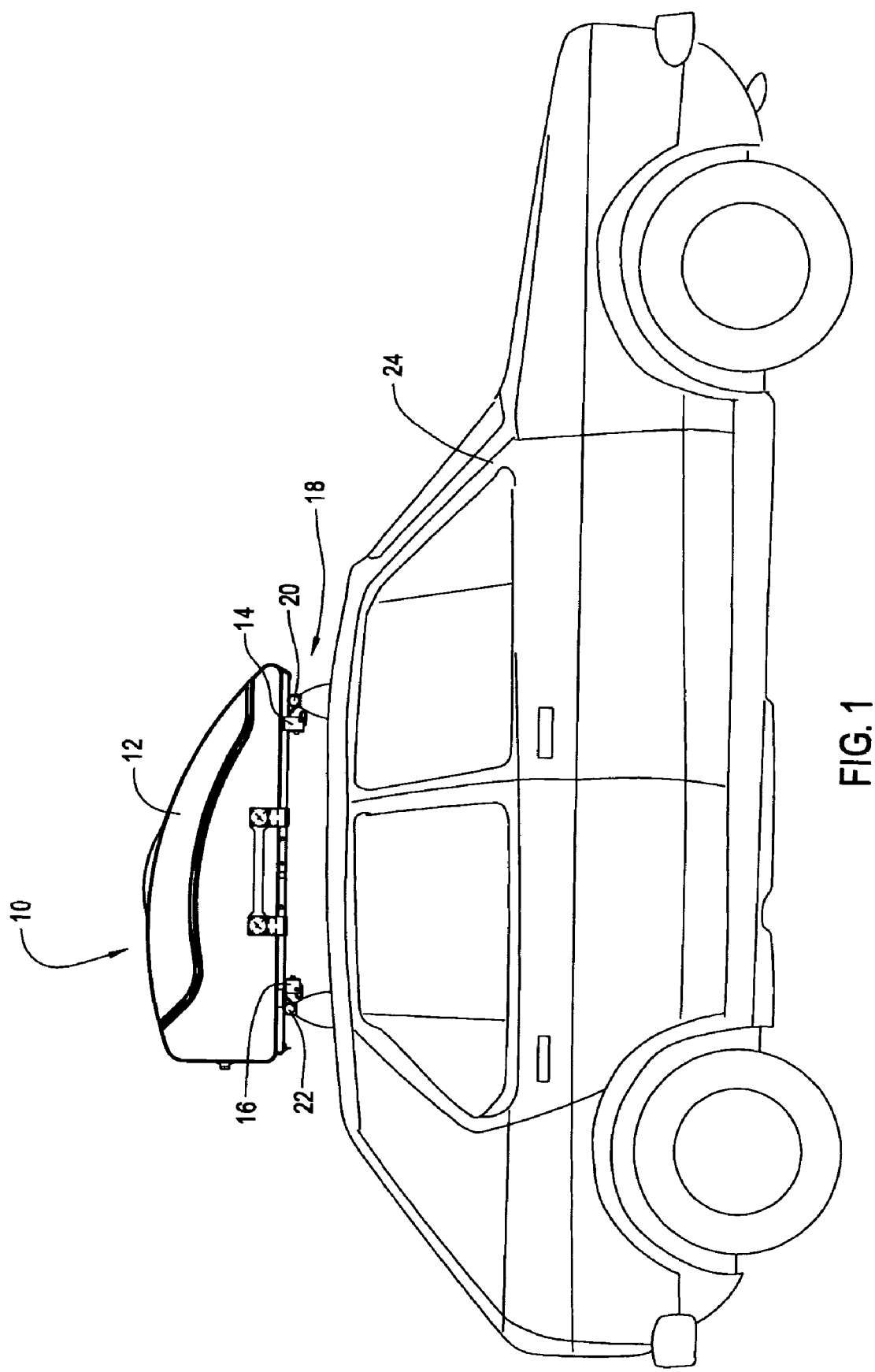
FIG. 1 is a side view of the cargo system of the preferred embodiments of the invention, shown on a roof rack of a vehicle.

As shown in FIG. 1, the cargo system 10 of the preferred embodiments includes a container 12, a first mount 14 coupled to the container 12, and a second mount 16 coupled to the container 12 for movement between an engaged position and a disengaged position. The cargo system 10 is preferably attachable and securable to a roof rack 18 having a first bar 20 and a second bar 22. Although the cargo system 10 was specifically designed for a roof rack 18 of a vehicle 24, the cargo system 10 could be used in other suitable environments. The first bar 20 and the second bar 22 of the roof rack 18 are preferably parallel to and distant from each other. In most cases, the roof rack 18 is supplied by the original manufacturer of the vehicle 24 or an aftermarket company (such as THULE or YAKIMA) and attached to the vehicle 24. The roof rack 18 may, however, be incorporated into the exterior of the vehicle 24, or sold with the cargo system 10.

Figure 4:
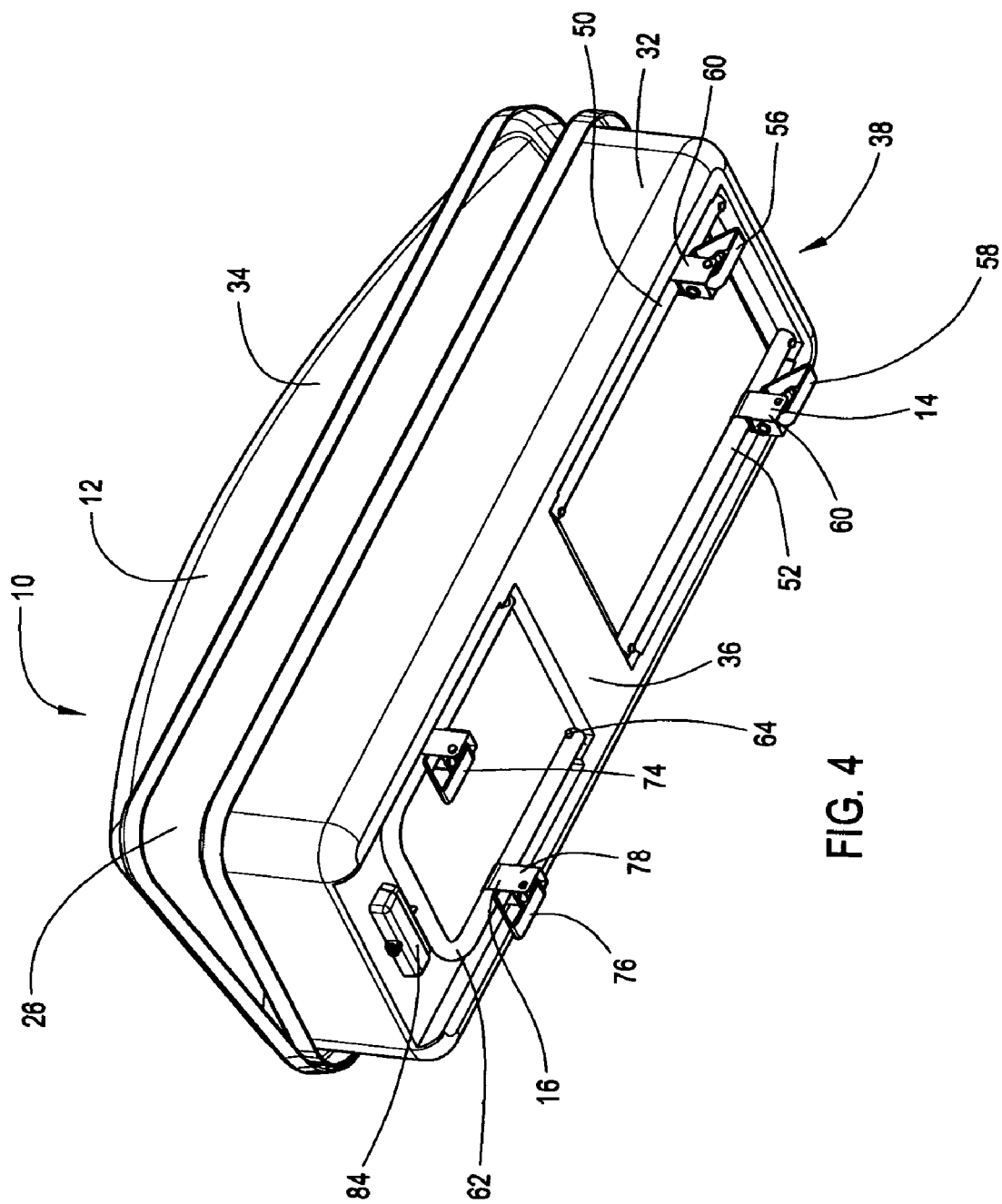
FIG. 4 is a perspective view of the cargo system of a second variation of the first preferred embodiment.

As shown in FIGS. 2 and 4, the container 12 of the preferred embodiments functions to hold cargo. In typical situations, the cargo is extra luggage that is too big, or outdoor equipment that is too sullied, for the interior compartment of the vehicle. Because the cargo system 10 requires significantly less time to secure on and remove from the roof rack than a typical cargo system, the cargo may alternatively be any equipment that is preferably kept together. To hold cargo, the container 12 of the preferred embodiments defines an enclosed cavity 26. The container 12 of alternative embodiments may, however, define other appropriate shapes to hold specific cargo, such as skis, boards, and poles. The container 12 can be made with different shapes and materials. In a first variation (shown in FIG. 2), the container 12 includes a bag 28 made from a flexible material (such as PVC coated nylon) with a zipper 30, drawstring, or other suitable closure that cooperates with the bag 28 to define the enclosed cavity 26. In this variation, the container 12 may resemble a duffel bag. In another variation (shown in FIG. 4), the container 12 includes a tub portion 32 made from a rigid material (such as an ABS plastic) and a lid portion 34. The lid portion 34 can be made from a flexible material (such as canvas) and fastened to the tub portion 32, or can be made from a rigid material (such as ABS plastic) and either hinged or removably fastened to the tub portion 32. The tub portion 32 and the lid portion 34 cooperatively define the enclosed cavity 26. In this variation, the container 12 may resemble a suitcase. As demonstrated, the container 12 can be made with any suitable shape and material to hold cargo.

In the preferred embodiments, the cargo system 10 may be attached, secured, unsecured and detached from the roof rack without entering into the enclosed cavity 26 of the container 12. In this manner, the cargo system 10 may be loaded with the equipment for a particular activity, attached to a vehicle before the particular activity, and removed from the vehicle after the particular activity. The cargo system of alternative embodiments, however, may require entrance into the enclosed cavity before attaching, securing, unsecuring, or detaching the cargo system.

The cargo system 10 of the preferred embodiments also includes a frame 36, which functions to couple the first mount 14 to the container 12 and to couple the second mount 16 to the container 12. The container 12 is preferably connected to the frame 36 with suitable fasteners (such as VELCRO or snap fasteners), webbing, or belts. The frame 36, which can be made with different shapes depending on the container 12, is preferably made of a rigid material (such as aluminum). In alternative embodiments, the frame 36 may be integrally designed within the container 12, and the cargo system 10 may omit a separate frame 36.

As shown in FIGS. 2 and 3, with the first variation of the container 12, the frame 36 preferably includes a first section 38, a second section 40, and a connector 42 that couples the first section 38 and the second section 40. The connector 42 preferably includes a pin 44, a slot 46, and a spring 48 that compensates for the lengthening or shortening of the first section 38 and second section 40 during temperature fluctuations and provides for a constant bias of the first mount 14 on the first bar and the second mount 16 on the second bar. The connector 42 may alternatively include a simple fastener or any other suitable device to couple the first section 38 and the second section 40. Furthermore, the first section 38 and second section 40 may be formed as a unitary piece or may be individually formed as multiple pieces.

As shown in FIG. 4, with the second variation of the container 12, the first section 38 of the frame 36 is preferably designed with a left first section 50 and a right first section 52, while the second section of the frame 36 is preferably omitted. Because of the rigidity of the tub portion 32 of the container 12, the frame 36 can omit the second section. Furthermore, the frame 36 could omit the left first section 50 and the right first section 52, and the first mount 14 could be coupled directly to the tub portion 32 of the container 12.

Figure 5:
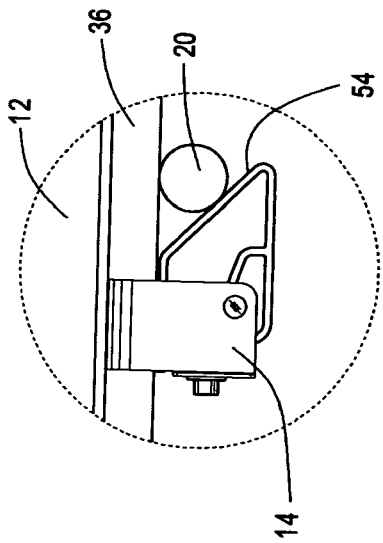
FIG. 5 is a detailed view of the mount, also shown in FIG. 6A.

As shown in FIG. 5, the first mount 14 of the preferred embodiments functions to engage the first bar 20. In the preferred embodiments, the first mount 14 includes a contact surface 54, which is adapted to cradle the first bar 20 against the frame 36, but may cradle the first bar 20 against the container 12 or any other suitable portion of the cargo system. By using an angle of approximately 45° between the contact surface 54 and the container 12, the first mount 14 preferably accommodates a first bar 20 with any cross-sectional design (circular, ovular, or rectangular). The arrangement of the contact surface 54 and the container 12 allows the first mount 14 to cradle (or "restrict movement of") the first bar 20 through preferably 315° of motion. In alternative embodiments, the first mount 14 may include two or more contact surfaces, and may solely cradle the first bar 20 (without the aid of the container 12).

As shown in FIGS. 2 and 4, the first mount 14 of the preferred embodiments includes a first left grip 56 and a first right grip 58. The first mount 14 of alternative embodiments may alternatively include a single first grip or more than two first grips. The first left grip 56 and the first right grip 58 are preferably fastenable to the container 12 at a distance from each other. The first left grip 56 and the first right grip 58 are also preferably selectively fastenable to the container 12 at multiple locations along the container 12 (which accommodates vehicles of different lengths), and are selectively fastenable to the container 12 at multiple angles to the container 12 (which accommodates roof racks with an arched first bar). In the preferred embodiments, the first left grip 56 and first right grip 58 are preferably coupled to the first section 38 of the frame 36 with a first clamp 60, which allows adjustment both along the container 12 and at multiple angles to the container 12. In alternative embodiments, the first left grip 56 and the first right grip 58 may be coupled directly to a container with an integral frame using a bolt and hole arrangement. The first left grip 56 and the first right grip 58 may alternatively be coupled to the frame 36 or to the container 12 with any suitable fastener.

Figure 6A:
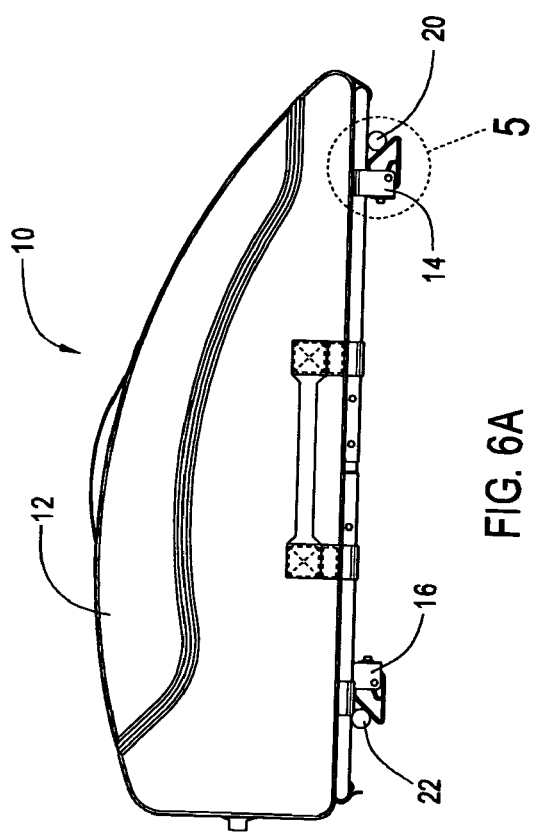
FIGS. 6A and 6B are side views of the cargo system of the first preferred embodiment, respectively shown in a closed position and an open position.
Figure 6B:
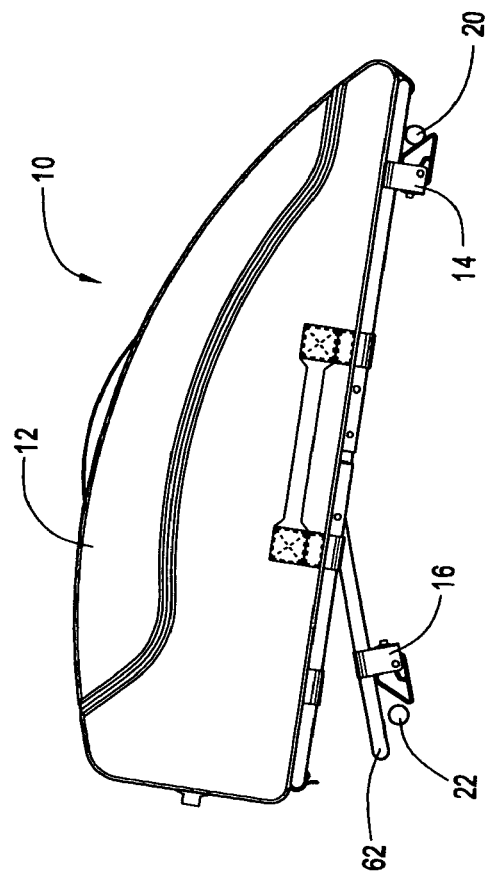

As shown in FIGS. 6A and 6B, the cargo system 10 of the preferred embodiments also includes an arm 62 coupled between the second mount 16 and the container 12 for movement between a closed position (shown in FIG. 6A) and an open position (shown in FIG. 6B). Movement of the arm 62 from the closed position to the open position preferably causes movement of the second mount 16 from the engaged position to the disengaged position, which allows placement of the first mount 14 onto the first bar 20 and placement of the second mount 16 onto the second bar 22 (preferably without decoupling the first mount 14 or the second mount 16 from the container 12). Further, movement of the arm 62 from the open position to the closed position preferably causes movement of the second mount 16 from the disengaged position to the engaged position, which biases the first mount 14 against the first bar 20 and biases the second mount 16 against the second bar 22. Because of the movement restriction imposed by the first mount 14 and the second mount 16, the act of biasing the first mount 14 against the first bar 20 and biasing the second mount 16 against the second bar 22 in an opposite direction attaches the cargo system 10 to the roof rack. By securing the second mount 16 in the engaged position (as discussed below), the cargo system 10 can be secured to the roof rack 18. The arm 62 can be coupled to the container 12 for pivotal movement, linear movement, or any other suitable movement between a closed position and an open position. The arm 62 is preferably made of a rigid material (such as aluminum).

As shown in FIGS. 2 and 4, the arm 62 of the first preferred embodiment is coupled to the second mount 16 and coupled to the container 12 for pivotal movement. The arm 62 can be coupled to the container 12 through the second section 40 of the frame 36 (shown in FIG. 2), or can be connected directly to the container 12 (shown in FIG. 4). In either case, the arm 62 is preferably coupled with a pin and socket arrangement 64, but may alternatively be coupled with any suitable device that allows pivotal movement.

Figure 7:
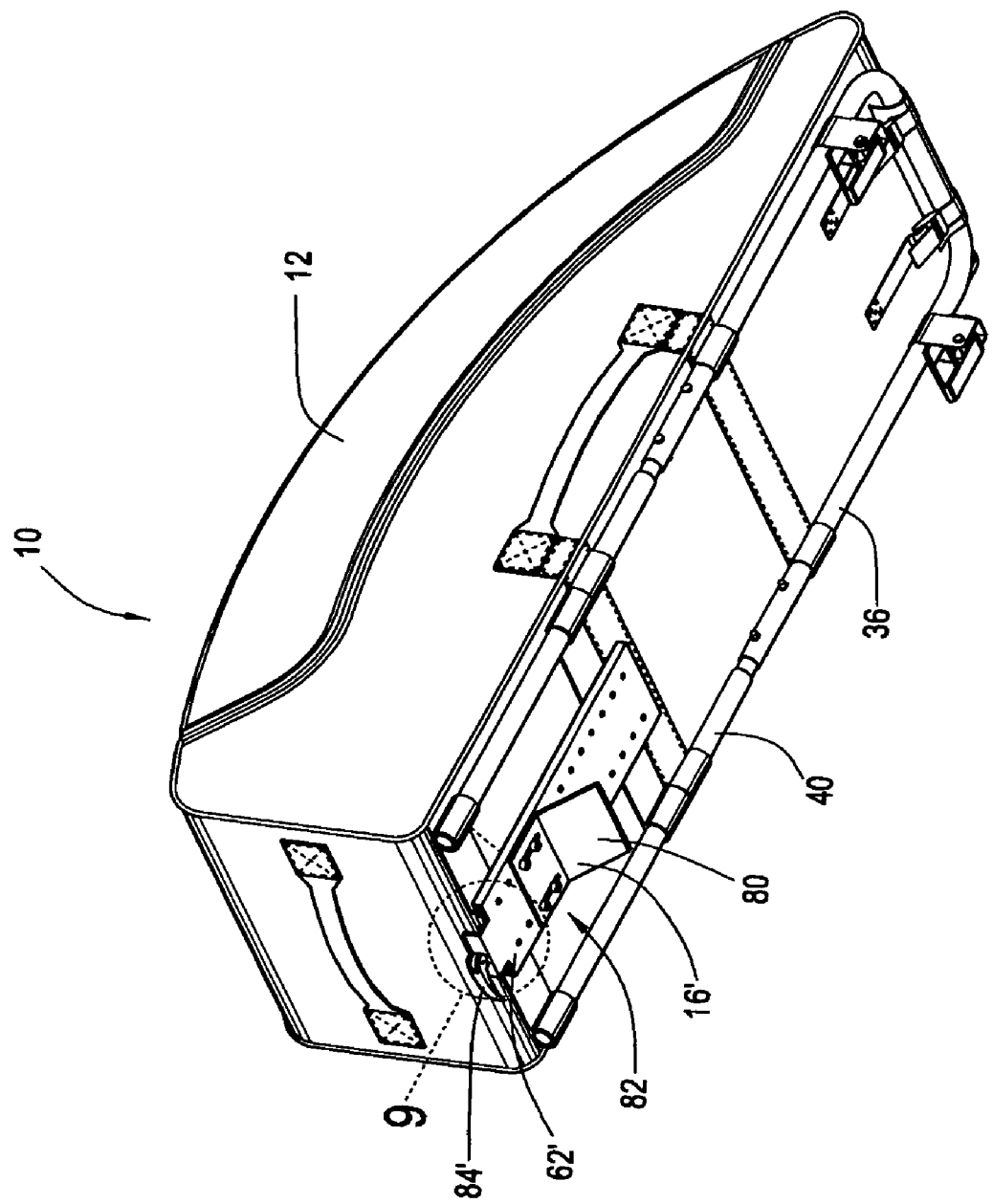
FIG. 7 is a perspective view of the cargo system of the second preferred embodiment.

As shown in FIG. 7, the arm 62' of the second preferred embodiment is coupled to the second mount 16' and coupled to the container 12 for linear movement between a closed position (shown in FIG. 8A) and an open position (shown in FIG. 8B). The arm 62' is preferably coupled to the container 12 through the second section 40 of the frame 36, but may alternatively be connected directly to the container 12. In either case, the arm 62' is preferably coupled with a guide 68 and a bracket 70 (shown in FIG. 9), but may alternatively be coupled with any suitable device that allows linear movement.

As shown in FIGS. 2 and 4, the second mount 16 of the preferred embodiments is preferably identical to the first mount 14, except that the second mount 16 functions to engage the second bar and is preferably coupled to the container 12 in an opposite direction than the first mount 14. The arrangement of the contact surface of the second mount 16 and the container 12 allows the second mount 16 to cradle (or "restrict movement of") of the second bar through preferably 315° of motion. When the first mount 14 is biased against the first bar and the second mount 16 is biased against the second bar in an opposite direction (shown in FIGS. 6A and 8A), the cargo system is attached to the roof rack. In alternative embodiments, the second mount 16 may include two or more contact surfaces, and may solely cradle the second bar.

The second mount 16 of the first preferred embodiment, like the first mount 14, includes a second left grip 74 and a second right grip 76. The second mount 16 of alternative embodiments may alternatively include a single second grip or more than two second grips. The second left grip 74 and the second right grip 76 are preferably fastenable to the arm 62 at a distance from each other. The second left grip 74 and the second right grip 76 are also preferably selectively fastenable to the arm 62 at multiple locations along the arm 62 (which accommodates vehicles of different lengths), and are selectively fastenable to the arm 62 at multiple angles to the container 12 (which accommodates roof racks with an arched second bar). The second left grip 74 and second right grip 76 are preferably coupled to the arm 62 with a second clamp 78, which allows adjustment both along the arm 62 and at multiple angles to the arm 62, but may alternatively be coupled to the arm 62 with any suitable fastener.

As shown in FIG. 7, the second mount 16' of the second preferred embodiment, unlike the first mount, preferably only includes only a second single grip 80. The second mount 16' of alternative embodiments may alternatively include multiple second grips. The second single grip 80 is preferably fastenable to the arm 62' at multiple locations along the arm 62' (which accommodates vehicles of different lengths), and along the center of the cargo system 10 (which to some degree accommodates roof racks with arched bars). The second single grip 80 is preferably coupled with a bolt and hole arrangement 82, which allows adjustment along the arm 62', but may alternatively be coupled to the arm 62' with any suitable fastener.

As shown in FIGS. 2 and 4, the cargo system 10 of the preferred embodiments also includes a latch 84, which functions to selectively secure the second mount 16 in the engaged position and secure the cargo system 10 to the roof rack. In the first preferred embodiment, the latch 84 selectively secures the arm 62 in the closed position and limits any pivotal movement of the arm 62. In the second preferred embodiment (shown in FIGS. 7 and 9), the latch 84' selectively secures the arm 62' in the closed position, limits any linear movement of the arm 62', and aids in the biasing of the first mount against the first bar and the second mount against the second bar. The latch 84' of the second preferred embodiment is preferably a handle 86 with a cam surface, but may alternatively be any suitable device. The latch 84 of the preferred embodiments preferably allows theft further protection through the use of a pad lock or key lock (not shown).

The preferred method of placing the cargo system of the preferred embodiments onto a roof rack includes three main steps: adjusting the cargo system, attaching the cargo system to the roof rack, and securing the cargo system to the roof rack. The step of adjusting the cargo system (the first step) includes placing the cargo system onto the roof rack with the arm in the closed position, moving the first mount relative to the container and/or moving the second mount relative to the arm such that the first mount is gently resting against the first bar and the second mount is gently resting against the second bar, removing the cargo system from the roof rack, moving either the first mount or the second mount a predetermined distance from its original location toward the closest bar. The predetermined distance is approximately 5 mm, but may vary depending on the size and materials of the cargo system (and the presence or absence of a connector with a pin, a slot, a spring arrangement).

The step of attaching the cargo system to the roof rack (the second step) includes: moving the second mount from the engaged position to the disengaged position through movement of the arm from the closed position to the open position, placing the first mount onto the first bar, placing the second mount onto the second bar (preferably without decoupling the second mount from, or moving the second mount relative to, the arm), and moving the second mount from the disengaged position to the engaged position (thereby biasing the first mount against the first bar and biasing the second mount against the second bar) through movement of the arm from the open position to the closed position. With the cargo system of the first preferred embodiment and the use of gravitational force, moving the second mount from the disengaged position to the engaged position may be accomplished by simply lowering the cargo system onto the roof rack. With the cargo system of the second preferred embodiment, moving the second mount from the disengaged position to the engaged position may be accomplished by moving the handle. The movement of the arm can include pivotal movement (using the first preferred embodiment), linear movement (using the second preferred embodiment), or any other suitable movement.

The final step of securing the cargo system to the roof rack (the third step) includes selectively securing the arm in the closed position. As an additional sub step, the final step may include fastening a pad lock or key lock to the latch. After the cargo system has been adjusted, attached, and secured to the roof rack, the cargo system may be used to hold cargo. The cargo system may be unsecured and detached from the roof rack with a reversal of steps 3 and 2. Further, the cargo system may be re-attached and re-secured to the roof rack without re-adjusting the cargo system. In this manner, the cargo system of the preferred embodiments may be easily and quickly secured on, and removed from, the roof rack. Without the necessity to fiddle with an individual adjustment point at each corner of the cargo system., a user should be persuaded to remove the cargo system when it is not needed, which will avoid an unnecessary reduction in fuel efficiency for the vehicle. Alternative methods of placing the cargo system onto a roof rack may include additional steps that do not affect the functions of the main three steps.

As a person skilled in the art of cargo systems will recognize from the previous detailed description and from the figures and claims, modifications can be made to the two preferred embodiments of the invention without departing from the scope of the invention, as defined in the following claims.

I claim:

1. A cargo system attachable to a roof rack having a first bar and a second bar, the cargo system comprising: a container; a first mount adapted to cradle the first bar and coupled to the container; a second mount adapted to cradle the second bar; and an arm fastened to the container for pivotal movement between an open position and a closed position and coupled to the second mount, wherein pivotal movement of the arm from the open position to the closed position biases the first mount against the first bar in a first direction and biases the second mount against the second bar in a second direction opposite to the first direction, wherein the arm is fastened to the container at a point that, when the arm is in the closed position, is substantially between the first mount and the second mount.

2. The cargo system of claim 1 wherein the first mount is fastened to the bottom surface of the container, and wherein pivotal movement of the arm from the closed position to the open position allows placement of the first mount onto the first bar and placement of the second mount onto the second bar without decoupling the second mount from the arm.

3. The cargo system of claim 1 further comprising a latch that selectively secures the arm in the closed position, thereby securing the second mount in the engaged position and securing the cargo system to the roof rack.

4. The cargo system of claim 1 wherein the second mount includes a second left grip and a second right grip; wherein the second left grip and the second right grip are fastenable to the arm at a distance from each other.

5. The cargo system of claim 4 wherein the second left grip and the second right grip are selectively fastenable to the arm at multiple locations along the arm.

6. The cargo system of claim 5 wherein the second left grip and the second right grip are selectively fastenable to the arm at multiple angles to the arm.

7. The cargo system of claim 1 wherein the container defines an interior and an exterior; and wherein the arm is located on the exterior of the container.

* * * * *